United States Patent [19]
Dent

[11] Patent Number: 5,657,288
[45] Date of Patent: Aug. 12, 1997

[54] EFFICIENT ADDRESSING OF LARGE MEMORIES

[75] Inventor: Paul W. Dent, Stehag, Sweden

[73] Assignee: Ericsson Inc., Research Triangle Park, N.C.

[21] Appl. No.: 527,389

[22] Filed: Sep. 13, 1995

Related U.S. Application Data

[63] Continuation of Ser. No. 227,139, Apr. 13, 1994, abandoned.
[51] Int. Cl.$^6$ .................................................. G11C 8/00
[52] U.S. Cl. ........................ 365/230.02; 365/189.02; 365/240
[58] Field of Search ................ 365/189.02, 230.02, 365/230.04, 189.03, 78, 240

[56] References Cited

U.S. PATENT DOCUMENTS

| | | |
|---|---|---|
| 4,067,059 | 1/1978 | Derchiak . |
| 4,112,490 | 9/1978 | Pohlman et al. . |
| 4,206,503 | 6/1980 | Woods et al. . |
| 4,403,284 | 9/1983 | Sacarisen et al. . |
| 4,479,178 | 10/1984 | Schabowski . |
| 4,884,197 | 11/1989 | Sachs et al. . |
| 4,901,227 | 2/1990 | Nomura et al. . |
| 4,933,910 | 6/1990 | Olson ........................ 365/230.02 X |
| 4,949,242 | 8/1990 | Takeuchi et al. . |
| 4,964,037 | 10/1990 | Woods et al. . |
| 5,032,983 | 7/1991 | Fu et al. . |
| 5,151,983 | 9/1992 | Nishiguchi . |
| 5,212,780 | 5/1993 | Padgaonkar et al. . |

FOREIGN PATENT DOCUMENTS

| | | | |
|---|---|---|---|
| 0 020 908A1 | 1/1981 | European Pat. Off. . | |
| 0134934 | 10/1979 | Japan ................ | 365/230.02 |
| 0110697 | 5/1987 | Japan ................ | 365/230.02 |
| 0179491 | 7/1988 | Japan ................ | 365/230.02 |

OTHER PUBLICATIONS

The publication A.R. Pleszkun et al., "An Address Prediction Mechanism for Reducing Processor–Memory Address Bandwidth," *IEEE Computer Society Workshop on Computer Architecture for Pattern Analysis and Image Database Management* pp. 141–148, Nov. 11, 1981, Hot Springs, VA.

*Primary Examiner*—David C. Nelms
*Assistant Examiner*—Son Mai
*Attorney, Agent, or Firm*—Burns, Doane, Swecker & Mathis, L.L.P.

[57] ABSTRACT

A computer memory device has a predetermined number of individually addressable storage cells and an internal addressing mechanism for storing a full address that determines which of the predetermined number of individually addressable storage cells will be accessed during a next memory access operation. The internal addressing mechanism includes a number of address segment registers whose concatenated outputs represent the full address. The width of each of the address segment registers is equal to the size of the address bus that couples the memory device to a processor. Mode control signals, sent by the processor, instruct the memory device to load a particular one of the address segment registers, thereby eliminating the need to include a number of address pins equal to the number of bits in the full address. The mode control signals may also be encoded to instruct the memory device to increment the full address for use during a next memory operation, or to use one or more previously read data bytes to either replace or modify existing values stored in the address segment registers, thereby reducing the number of address bits which must be communicated from the processor to the memory device. Additional pin and energy savings may be achieved by multiplexing the data and address lines. The mode control signals may be encoded to indicate how the multiplexed interface is being used during any particular memory cycle. A compatible processor includes logic for generating the various mode control signals during memory operations.

11 Claims, 5 Drawing Sheets

EFFICIENT ADDRESSING OF LARGE MEMORIES

This application is a continuation of application No. 08/227,139, filed Apr. 13, 1994, abandoned.

BACKGROUND

The present invention relates to efficient addressing of large memories in a computer system, and more particularly to a simplified addressing mechanism which permits a memory device to have fewer address pins than there are address bits required to address the corresponding memory space, and even more particularly to such a memory that is also capable of providing the contents of a location alternatively from a next sequential address, or from an address specified by a processor.

In modern technology, the use of microprocessors in battery-operated portable applications has become widespread. Examples of such technology include the use of microprocessors in lap-top computers, and in embedded applications such as cellular phones. The word "embedded" is here used to distinguish applications in which the existence of a microprocessor in the product is a matter of design choice and not primary to the product's function, from those applications in which the existence of a processor is primary to the product's functions. Both of the above technological environments are characterized by small size, cost and limited battery consumption requirements, coupled with increasing complexity, and consequent increasing size, in the computer programs for controlling the devices. The push for increasingly complex computer programs in portable applications results from the desire to provide more features, coupled with the economic feasibility of using larger and larger program memories resulting from the continuing decline in the cost of such memories.

Typical microprocessors used in today's battery operated devices include the INTEL 8051, HITACHI 6303 and ZILOG Z80. These processors are often used as the main control processors in cellular phones and other embedded applications. Applications where the existence of a processor is primary to the product's functions are exemplified by personal computer (PC) or lap-top computer products. The most common microprocessors found in these applications are the INTEL 8088/8086 and its family of enhancements and the MOTOROLA 68000.

The 8051, 6303 and Z80 microprocessors have 8-bit wide data buses and 16-bit wide address buses. A 16-bit wide address bus provides the capability of selecting any one of 2 to the power 16 (=65,536) 8-bit bytes. The usual connection of such a processor to memory chips is illustrated in FIG. 1, in which a Z80 processor 10 is connected to a random access memory (RAM) 11 as well as to a read only memory (ROM) 12. In this application, the RAM 11 is used for storing program data (i.e., operands), and the ROM 12 is used for storing program instructions. The two memory chips are attached to the same bus, but the response of one or the other to an address is determined by activation of one of the Chip Select signals CS1 and CS0. CS1 is activated to enable the RAM 11 chip only if the address is, for example, in the top 16k of the 64k byte address space. In this example, CS0 is activated to enable the ROM 12 chip only if the address is in the other 48 kbytes. The ROM 12 chip could very likely be capable of responding to addresses in the top 16k range also, if it is a full 64k byte chip, and thus must be prevented from doing so and interfering with RAM reads.

When the above microprocessor architectures were conceived, the implementation of a 64k byte memory, which was thought at the time to be a large memory, required several silicon chips. By contrast, 64 kbytes of ROM are now readily available in a single chip, and a 32 kbyte RAM is considered a small chip.

A typical embedded application, such as a cellular phone controller, can comprise a fixed ROM program representing perhaps 75% of the 64k byte memory space with the remaining 25% of the address space being allocated to RAM for storing and retrieving dynamically varying quantities. Memory technology has moved on and 512 kbytes of program ROM can now be obtained on a single chip. This program storage capacity has been absorbed in the more complex, modern, digital cellular phones, such as in the pan-European Global System for Mobile communication (GSM), as part of the technical means to increase capacity for more conversations. The need for RAM storage has not increased as much, and represents perhaps only 5% of the total memory address space.

PC applications are distinguished by the need to be able to run any program the user chooses, and not just a fixed program, so virtually all memory is both readable and re-writable (i.e. RAM). Nevertheless, at any given instant during the running of a computer program, a region of this RAM is loaded with program instructions which do not change during program execution (i.e., this portion of RAM is used in a read only mode) while other regions of the RAM are used for both reading and writing of dynamically changing variables. It is possible for a program stored in RAM to dynamically alter itself, but this is considered a dubious programming trick to be used only where no good alternative exists. It is the virtue of a Von Neumann architecture that allows a program stored in data memory to be executed. This possibility is excluded in the so-called Harvard architecture (described in further detail below).

In PC applications, a 512 kbyte memory, whose address space requires a 19 bit address, is now considered barely adequate and a memory of from 4 to 16 megabytes, whose address space correspondingly requires an address ranging in size from 22 to 24 bits, is rapidly becoming the norm. Thus, as memory chips become denser and cheaper, the width of the address bus becomes increasingly larger than the width of the data bus, and dominates the chip package pin count.

The result in embedded applications, such as cellular phones, is that the goal to reduce size by retaining an 8-bit data bus is defeated by the increasing width of the address bus.

Another critical goal in these applications is the need to keep power consumption as low as possible. Energy is consumed from the battery whenever the small capacitance of input/output pins or printed circuit wiring tracks is charged or discharged by a voltage changing from the logic '1' level to the logic '0' level or vice-versa. When a 24 bit address is required for accessing an 8-bit information byte, the need to output the address from the central processing unit (CPU) to the memory can thus cost three times more power than that which is required in order to receive the information byte in return.

Prior art systems commonly place RAM (sometimes called data memory) on the same bus as ROM (sometimes called program memory). Exceptions are found in special devices known as Digital Signal Processors, such as the TEXAS INSTRUMENTS TMS320C25, which are designed to maximize processing speed and therefore provide the ability to access program memory and data memory simultaneously on two separate buses. These machines are often also of so-called Harvard architecture type, in which program and data memories constitute two separate address spaces, as distinct from Von Neumann architectures where program and data memory are parts of the same address space. The concept of Harvard versus Von Neumann architectures is however distinct from whether there are separate program and data memory buses. For example, the INTEL 8051 is a Harvard architecture which has the same bus for both; it just runs slower as a result of not being able to access both memory regions simultaneously as compared with a separate-bus Harvard architecture.

The prior art also contains examples (e.g. the INTEL 8085) in which chip pin count is reduced by timesharing at least some of the pins for both data and address lines. The cited 8085 microprocessor has a 16-bit address bus whose least significant 8 bits are also time multiplexed for use as the data bus. In this case, the CPU operates by applying a 16-bit address to the bus while generating a signal called Address Latch Enable (ALE) and then removing the address from the least significant 8-bit lines while outputting a Read or Write control signal to the memory and re-using the 8 lines for an 8-bit byte data transfer. Nonetheless, the sixteen address lines are in one-for-one correspondence with the sixteen bits required for addressing the entire address space.

SUMMARY

It is therefore an object of the present invention to provide a mechanism for significantly reducing the number of pins needed to address a large memory.

It is a further object of the present invention to reduce power consumed by addressing a large memory.

It is a still further object of the present invention to decrease the time required, on average, to address a large memory, thereby increasing speed.

In accordance with one aspect of the present invention, the foregoing and other objects are achieved by time-sharing a limited number of pins between different address bits in a most efficient manner. The inventive computer memory device comprises a data store including a predetermined number of individually addressable storage cells for storing data and a data port, coupled to the predetermined number of individually addressable storage cells, for exchanging data with an addressed one of the predetermined number of individually addressable storage cells. The memory device also includes an internal addressing means for storing a full address that determines which of the predetermined number of individually addressable storage cells will be accessed during a memory access operation, the full address comprising at least two concatenated address segments. The internal addressing means comprises at least two address segment registers, the outputs of which, when concatenated, represent the full address; and address segment input means, coupled to the address segment registers and responsive to a first control signal, for receiving an input address segment from a processor, the received input address segment alternatively representing one of the concatenated address segments. The address segment input means stores the input address segment into a corresponding one of the address segment registers as determined by said first control signal. The first control signal is generated by logic within the memory device in response to mode control signals, received from the processor, representing an address segment load operation for a particular one of the address segment registers. The described arrangement eliminates the need to provide a number of address I/O pins equal to the number of bits required for representing the full address.

Instead, the processor need only transmit segments of the full address as needed, with the memory device providing the remaining bits for fully addressing the data store.

In accordance with another aspect of the invention, the computer memory device further comprises incrementing means, coupled to the address segment registers and responsive to a second control signal, for adjusting values stored in the address segment registers so as to increment the concatenation of output signals that represents said full address. The second control signal is generated by logic in the memory device in response to a received mode control signal indicating a full address increment mode.

In accordance with yet another aspect of the invention, the pin count for the memory device and a corresponding processor may be reduced by further multiplexing the use of the address segment pins so that they may also be used to convey data between the memory device and the processor. Another encoding of the mode control signals would, in this case, indicate how the pins are being used at any time.

Additional savings in energy and time may be obtained in accordance with further aspects of the invention in which the memory device includes hardware for storing, in response to particular encodings of the mode control signals, one or more data values that were retrieved from memory by the CPU, and using these stored values to replace or modify the values stored in one or more of the address segment registers.

In still other aspects of the present invention, a processor for use with the various embodiments of the memory device includes the hardware necessary for generating appropriate address segment and mode control signals.

The invention allows various options of RAM or ROM to be used according to the application, and is compatible with both Von Neumann and Harvard architectures.

BRIEF DESCRIPTION OF THE DRAWINGS

The objects and advantages of the invention will be understood by reading the following detailed description in conjunction with the drawings in which.

DETAILED DESCRIPTION

Figure 1:
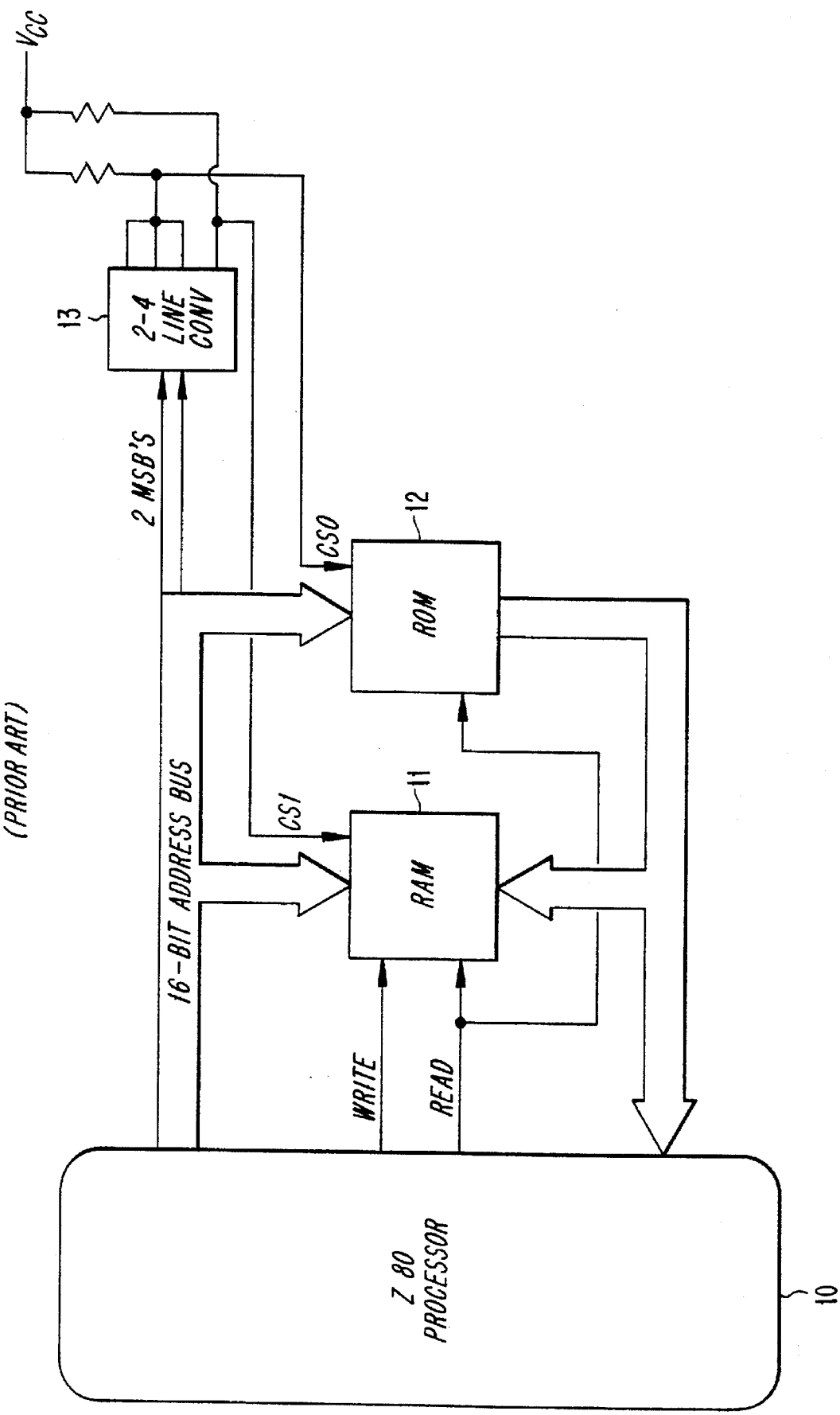
FIG. 1 is a block diagram of a prior art system in which a processor is connected to a random access data memory as well as to a read only program memory.
Figure 2:
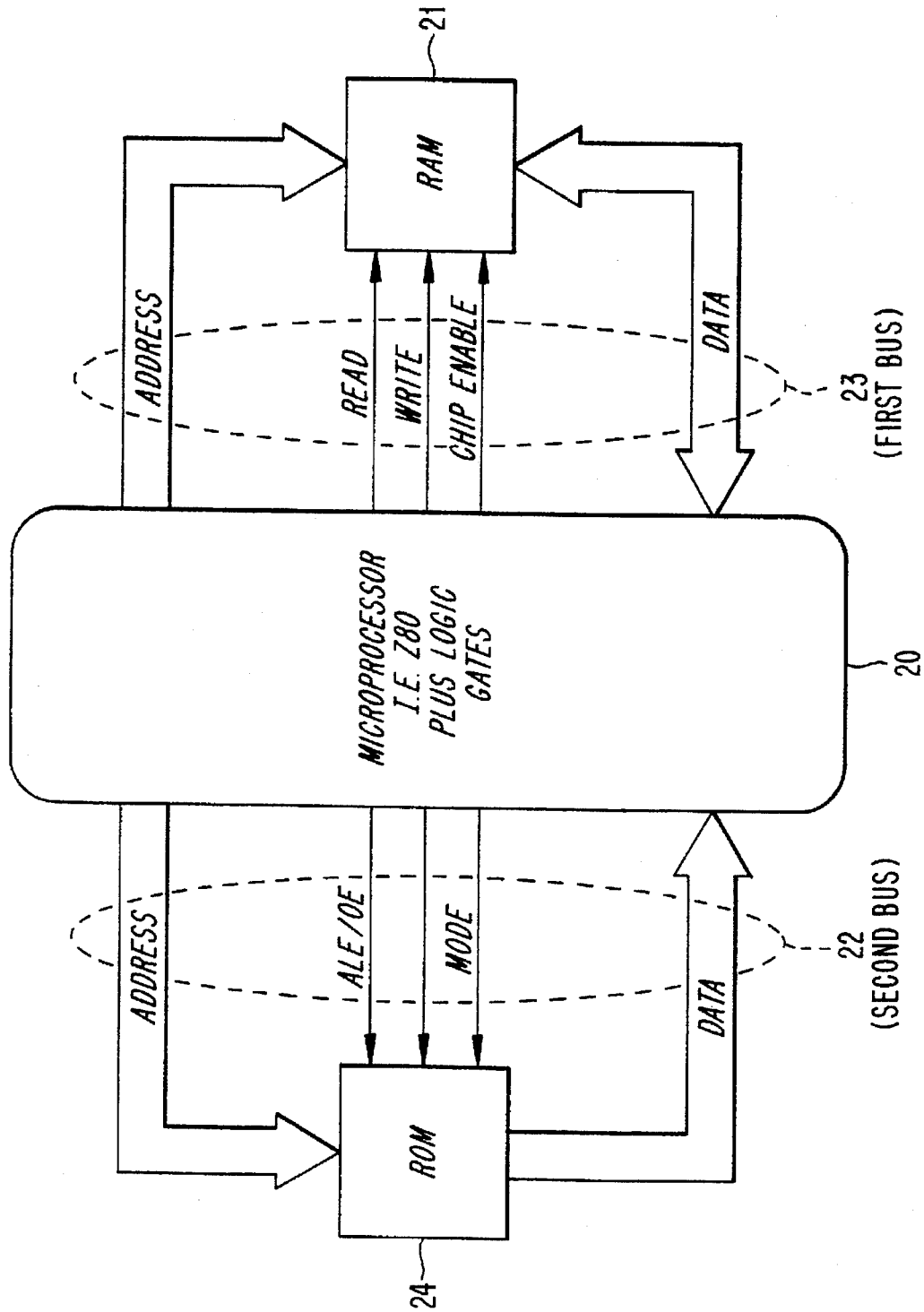
FIG. 2 is a block diagram of one embodiment of a system in accordance with the present invention.

Referring now to FIG. 2, a preferred embodiment of the present invention is shown. A microprocessor 20 which may, for example, be a Z80 microprocessor plus logic gates, is configured to provide a first bus 23 of address and data lines to a Random Access Memory (RAM) 21 together with Read, Write and Chip Enable lines as appropriate to interface with standard RAM chips. The logic gates may be used, for example, to provide a memory segment management function that allows the Z80 to address more than 64 kbytes of memory. The logic gates may also be used to construct DMA interfaces for RAM sharing with other processors and/or expanding interrupt handling capacity. The microprocessor provides a second bus 22 for coupling with a program memory chip which, in the preferred embodiment of an embedded application, is the Read Only Memory (ROM) 24. In future embedded applications in which, as mentioned above the RAM represents a decreasing fraction of the total memory, it is envisaged that the RAM could be integrated onto the same silicon chip as the CPU itself, so that there is no particular pressure to reduce the number of connections between the CPU and the RAM. However the ROM for various reasons would likely remain a separate chip and thus it is desirable to reduce the number of wires necessary on the second bus 22.

In the present example, the microprocessor 20 is presumed to have an address space requiring 20–24 bits for addressability. According to a first aspect of the invention, the second bus 22 contains, in addition to the 8-bit data bus, only 8 address lines, two mode control lines, an Output Enable (OE) and an Address Latch Enable (ALE) signal, these last two signals being represented in the figures as the bundled signals labelled "ALE/OE". When the mode control lines, which are controlled by the microprocessor 20, are in the logic state 01, it signifies to the ROM 24 that the address lines will convey the least significant 8 bits of a 24-bit address upon the ALE signal changing state. When the mode control bits are in the state 10, the middle 8 bits of the 24-bit address will be conveyed, and when in state 11 the most significant 8 bits of the 24-bit address will be conveyed. State 00, which has no particular significance to this first aspect of the invention, will be discussed below. Of course, the ROM 24 must have internal means for latching up, in an appropriate location, the 8 address bits being transferred, so that it can internally maintain the full 24-bit address. Thus according to this first aspect of the invention, the 24-bit address is conveyed byte-serially in three parts. Upon the Output Enable (OE) signal changing state, the 8-bit byte stored in the ROM 24 at the 24-bit address previously transferred by this means will be output on the 8-bit data bus. An important feature of this aspect of the invention is that the separate address segments (in this example, 8-bits per segment) are not transferred as part of a single bus transaction, but are instead transferred only when the microprocessor 20 determines that such transfer is necessary in order for the ROM 24 to have the full address to be accessed. Consequently, the address segments need not be transferred in any particular order, nor is there any requirement that they all be transferred each time data is to be fetched. For example, if data is to be fetched from a contiguous 256 byte "page" of memory, one may arrange to have only the lowest 8 bits of the address conveyed. Remaining address bits may be transferred from the microprocessor 20 to the ROM 24 whenever they change, as when, for example, a memory operation is to access a location that is out of the memory "page" currently pointed to by the ROM's internal address latch. The above-described feature of the present invention reduces, but does not entirely eliminate the need to periodically transfer a 24-bit address as program execution proceeds. Whenever this 24-bit address transfer needs to occur, it is just as power consuming to transfer a 24-bit address on 24 parallel lines as on 8 lines multiplexed three times. Furthermore, multiplexing the three 8-bit address segments is more time consuming. To reduce this overhead, a second aspect of the invention is to exploit the knowledge that microprocessor program execution, for the vast majority of the time, requires program bytes to be read from sequential locations in program memory. Only when a program jump, call, interrupt or context switch occurs (which are all forms of program branching) is it necessary to read the next program byte out of sequence. After a branch, a new sequential sequence will be followed for a while until resuming the old sequence or executing another branch. Thus according to a second aspect of the invention, the need to transfer addresses may be avoided for the majority of byte-reads by designing the program memory chip to output the next byte in sequence unless told to do otherwise. The previously undefined 00 state of the two mode control lines is preferably used to signify that the program memory should auto-increment the last address after each byte read. Alternatively, the ALE signal may be used to effect the auto-increment operation, so that the possibility will exist to re-read the same byte several times in succession by activating the OE signal without activating the ALE signal. The choice is a matter for the designer and depends on whether other devices, which may prefer one or the other alternative, are to be connected to the same bus.

In accordance with a third aspect of the invention, the pin count is further reduced by combining the data and address buses into a single 8-bit bus. In this embodiment, the mode control bits are preferably used to signify the purpose for which the bus is currently being employed as follows:

| | |
|---|---|
| 00 | 8-bit data transfer |
| 01 | 8-bit least significant byte of address |
| 10 | 8-bit middle byte of address |
| 11 | 8-bit most significant byte of address |

A single strobe combining the functions of OE and ALE can in principle be employed to synchronize the 8-bit transfer in all four cases. In this case, opposite edges of the strobe signal can be employed for synchronizing the address and then the data. For example, positive-going edges may synchronize an address byte transfer while negative going edges may synchronize a data byte transfer. A Chip Enable line may also be provided to completely de-activate the memory (and in particular to save power) when that particular chip is not currently being accessed by the microprocessor 20 (for example when two or more chips are used to expand the memory space, or when the microprocessor 20 is addressing internal RAM.)

In the above embodiment, the bus is a bi-directional bus transferring address information from the microprocessor 20 to the ROM 24, and transferring data at least from the ROM 24 to the microprocessor 20. Bi-directional buses are implemented by well-known means called TRISTATE in which an electrical line can be in one of the three states:

Sending a logical '1';

Sending a logical '0', or

Receiving.

Given a TRISTATE (Bi-Directional) bus of this type, it is also possible to permit data transfer from the microprocessor 20 to a memory, that is, to interface with RAM as well as ROM. In this case a Read/Write signal is required for indicating the direction of data transfer. This would permit the use of RAM program memory, as in PC applications, which can be loaded with different programs at different times while still obtaining the benefit of reducing address transfer overhead due to the principally sequential execution. The reduction of addressing overhead is not as pronounced when RAM configured according to the invention is used for data variables that are accessed in random order. However, if programs are constructed in such a way as to locate frequently addressed variables in the same 256-byte page, they may be randomly accessed within the page by changing only the least significant address byte. Of course as many as possible of the random access variables should be located on any existing on-chip RAM so that the microprocessor 20 does not even have to communicate with the external world to access them.

Figure 3A:
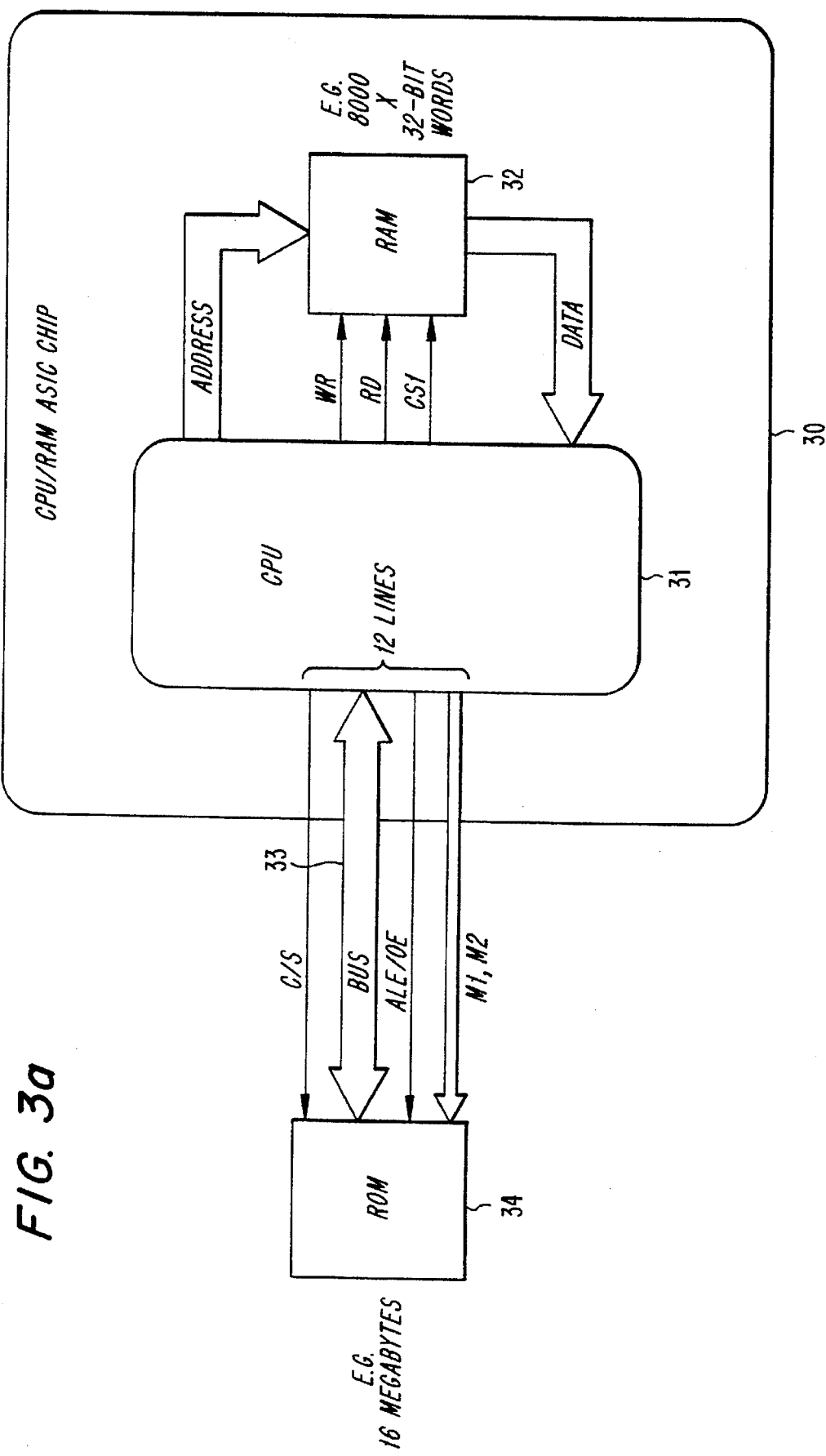
FIGS. 3a–b are a block diagram of another embodiment of a system in accordance with the present invention, and a corresponding memory timing diagram.

Referring now to FIG. 3a, a preferred microprocessor and memory configuration for an embedded application is shown. The CPU 31 and data RAM 32 are located on the same chip 30. An 8-bit bi-directional bus 33 communicates with a large external program ROM 34. A chip select line CS and ALE/OE line together with the two mode control signals M1 and M2 complete the interface between the CPU 31 and its program ROM 34. The interface requires only 12 lines compared to the prior art's 34 for the same functionality (i.e., 24 bits for addressing, plus 8 bits for data, plus 1 chip select bit, plus 1 output enable bit). Moreover, the average operating speed can be higher than that which is achievable with the prior art solutions because for most of the time the ROM 34 anticipates the next address to be one higher than the previous address and does not have to wait for an address transfer. In fact the ROM 34 can in principle be internally organized as two memories of 8 megabytes each, so that even-addressed bytes are stored in one half and odd-addressed bytes in the other half. Upon addressing an even byte for example, it is known that the next byte in sequence will be an odd byte and that can also be pre-fetched and stored in a register. Upon reading the addressed even byte, the even address register is incremented while an 8-way switch is activated to take the next byte from the register associated with the odd memory. Thus the delay between a read request and obtaining the next 8-bits of data (which is usually how access time is defined) is only the delay in activating the TRISTATE bus drivers and is not limited to the ROM access time.

Figure 3B:
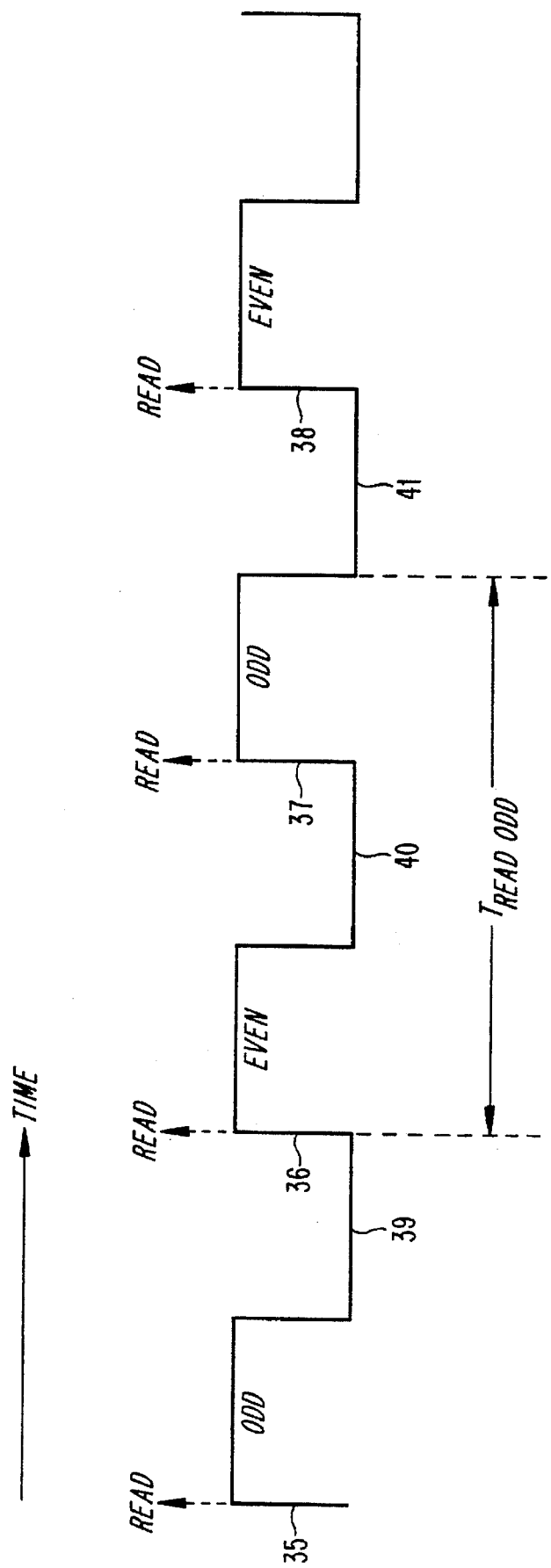

This is illustrated in the memory access timing diagram of FIG. 3b. Odd address read requests 35, 37 alternate with even address read requests 36, 38. After odd address read request 35, the requested odd byte of data (which has been prefetched) is output during interval 39. At the same time, the odd address register is incremented and a fetch of the next odd byte is initiated. Following even address read request 36, the requested even byte of data (which has been prefetched) is output during interval 40, while at the same time the even address register is incremented and a fetch of the next even byte is initiated. Next, odd address request 37 is made. During interval 41, the data whose fetch was initiated during interval 39 is output, the odd byte address register is incremented, and a prefetch of the next odd byte is initiated. The prefetch pattern repeats as described. This strategy provides the advantage, for example, of having the time available for accessing odd memory $T_{READ\ ODD}$ include the entire next even address read cycle in addition to the next odd address read cycle. Even address memory accesses achieve a similar advantage.

The frequency with which reads may be performed is limited to twice the memory speed in the above example. However, this can be raised by simply dividing the ROM 34 into more than two (even and odd) banks.

As described above, the advantage of the invention is a significant reduction of the number of pins needed to address large memories. This can be achieved without an efficiency penalty in the case of program memory by including, within the memory, means to anticipate that the next address will be one greater than the previous address unless otherwise indicated by the CPU. In fact, as shown below, savings can arise in both speed and bus power consumption for the inventive arrangement.

Consider a 'worst case' microprocessor instruction which instigates two changes of address in the same instruction. The example used is an indirect program-counter relative jump. This instruction is assumed to consist of a single byte instruction code, followed by a 1-byte offset which must be added to the program counter to obtain the address from where, in turn, a 3-byte quantity will be retrieved to become the address of the next instruction. The layout of such a stored program is illustrated below:

Address = x: Jump via here plus
x + 1: offset
x + 2: ...
x + 3: ...
: ...
: ...
x + offset + 1: byte 1 of final jump destination
x + offset + 2: byte 2 of final jump destination
x + offset + 3: byte 3 of final jump destination As shown above, it is common that the offset is measured from the end of the 2-byte jump+offset instruction.

The table below lists the bus transactions that would take place for the illustrated program instruction according to the prior art and the current invention, respectively:

| PRIOR ART | Bits | Mode bits | PRESENT METHOD | Bits |
| --- | --- | --- | --- | --- |
| 24-bit address X to ROM | 24 | 00 | already anticipated read JUMP instruction | 8 |
| read JUMP instruction | 8 | | already anticipated | |
| x + 1 to address bus | 24 | 00 | read offset byte | 8 |
| read offset byte | 8 | | calculate y = x + 1 + offset | |
| calculate y = x + 1 + offset | | 01 | byte 1 of y to bus | 8 |
| y to address bus | 24 | (10 | byte 2 if 1→2 carry | 8) |
| read byte 1 of destination | 8 | (11 | byte 3 if 2→3 carry | 8) |
| | | 00 | read byte 1 of destination | 8 |
| y + 1 to address bus | 24 | | | |
| read byte 2 of destination | 8 | 00 | read byte 2 of destination | 8 |
| y + 2 to address bus | 24 | 00 | read byte 3 of destination | 8 |
| read byte 3 of destination | 8 | | | |
| | | 01 | destination byte 1 to bus | 8 |
| destination to address bus | 24 | 10 | destination byte 2 to bus | 8 |
| | | 11 | destination byte 3 to bus | 8 |
| read next instruction code | | 00 | read next instruction code | |
| Total 24-bit transactions: | 6 | | Total 24-bit transactions: | 0 |
| | | | Total 8-bit transactions: | 9–11 |
| Total 8-bit transactions: | 5 | | Total 2-bit transactions: | 4–6 |
| | | | Total bit transactions: | 80–100 |
| Total bit transactions: | 184 | | | |

From the above it is seen that, for this "worst case" instruction, the total number of bus transactions is, at worst, eleven, which is the same as in the prior art, and is often nine or ten due to addition of the offset byte not necessarily causing carries to the other two address bytes. Consequently, a 10% speed improvement can, on average, be anticipated for the memory addressing mechanism of the present invention. Furthermore, the bus power consumption is reduced in proportion to the reduced number of bit transactions, so that it comes down to a value that is anywhere from 43 to 55% of the power consumption of the prior art.

Also from the above, it is seen that the number of pins used in the prior art is 24 address pins, 8 data pins, a Chip Select line and an Output Enable line, making a total of 34 pins. By comparison, the inventive method uses only an 8-bit bus, two mode control lines, a Chip Select pin and a STROBE pin, thus requiring only 12 pins (a 22 pin savings over the prior art). Thus the present invention allows substantial savings in pin count and power as well as perhaps affording a modest increase in computer speed.

According to a fourth aspect of the invention, a greater increase in speed and a further reduction in power may be achieved by transferring a greater degree of intelligence into the program memory. By expanding the number of mode control lines from 2 to 3, eight different modes may be defined, for example, as follows:

| MODE LINES | FUNCTION |
|---|---|
| 000 | Read byte and increment address by 1 |
| 001 | Read byte and increment address by its value |
| 010 | Read byte and hold to add to middle address byte if next mode is 001 |
| 011 | Read byte and hold to become a new address byte after three consecutive 011 modes. |
| 100 | Reset address to zero |
| 101 | Load Address byte 1 |
| 110 | Load Address byte 2 |
| 111 | Load address byte 3 |

With this intelligence built into memory, the indirect relative jump example used above results in the following sequence of bus transactions:

| MODE | OPERATION |
|---|---|
| 000 | Read JUMP operation code |
| 001 | Read next byte and increment address by its value |
| 011 | Read byte and hold |
| 011 | Read byte and hold |
| 011 | Read byte and replace address by this and the two previous bytes read. |

This implements the indirect relative jump instruction in five 8-bit bus plus 3 modebit transactions, a factor of 2.2 increase in speed, and a factor of 3.3 reduction in bus power consumption, over the prior art.

An exemplary embodiment of a memory device having many of the above-described features will now be described with reference to FIG. 4. The exemplary memory device, which may alternatively be a ROM or a RAM, includes a data store 401, which comprises a number of individually addressable storage cells 403. After a data read operation, the data appears in the data port 405.

The address space defined by the number of storage cells 403 requires a full address 407. This address is derived by concatenating the outputs of an appropriate number of address segment registers 409. The width of each one of the address segment registers 409 is equal to the width of the address bus 411 that carries the address segment transmitted by a processor (not shown). For example, if a full address 407 is twenty-four bits wide and the address bus 411 receives eight address bits at a time from the processor, then three eight-bit wide address segment registers 409 will be required. Address segment data load control logic 413 receives the address segment from the processor, and loads it into the appropriate one of the address segment registers 409 under the control of an address segment load control signal generated by a control signal generator 415. The control signal generator produces an appropriate address segment load control signal on the basis of mode control signals received from the processor in accordance with the principles described in detail above. For example, if the above-described two-bit mode signals are used, then the mode values 01, 10, and 11 may indicating loading, respectively, the least significant, middle, and most significant address segment register 409.

The exemplary memory device also includes address increment control logic 417, coupled to the plurality of address segment registers 409, for causing an increment of the full address 407. The address segment increment control logic 417 causes this address incrementing operation in response to an address increment control signal that is generated by the control signal generator 415. As fully described above, the mode control signals received from the processor may be encoded to include an increment command.

Also included in the exemplary memory device is address adjusting logic 419, which includes a register 421. The address adjusting logic 419 acts under the direction of control signals, generated by the control signal generator 415, to cause the contents of the plurality of address segment registers 409 to become a value that is a function of one or more data values that were previously read from the data store. The register 421 is coupled to the data port 405 so that it can receive and store these previously read values for use at the appropriate time. As fully described above, the mode control signals from the processor may be encoded any number of ways so as to cause the address adjusting logic 419 to load one or more address segment registers 409 with the contents of previously read data values from the data store 401. Alternatively, the address adjusting logic 419 may be instructed by the mode control signals to add one or more values previously read from the data store 401 to the corresponding values presently stored within the address segment registers 409. The address adjusting logic 419 ensures that appropriate carry bits are carried from an address segment register of lesser significance to one of greater significance, to ensure that the full address value has been correctly adjusted.

Figure 4:
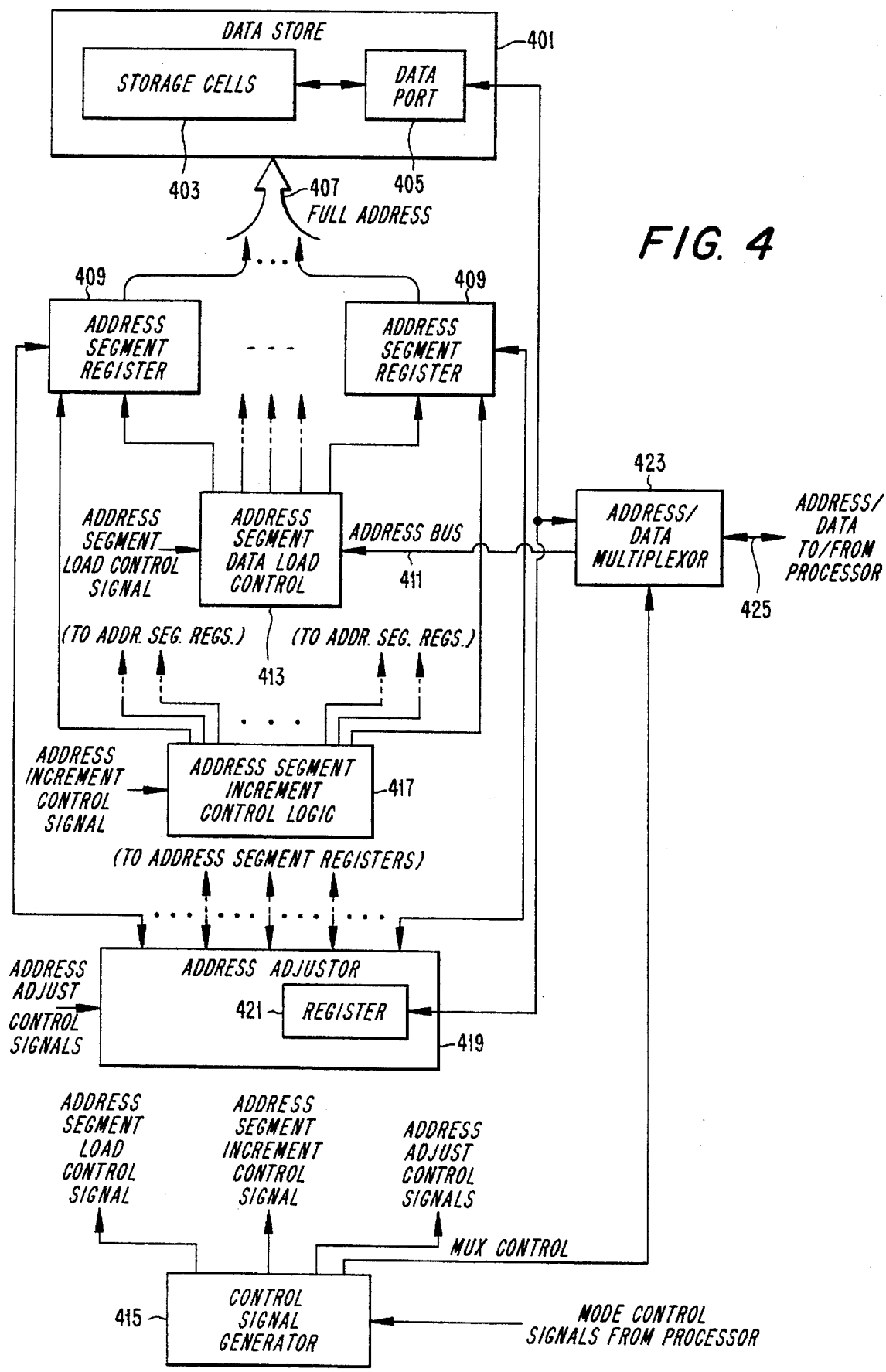
FIG. 4 is a block diagram of an exemplary embodiment of a memory device in accordance with the present invention.

The exemplary memory device shown in FIG. 4 also includes bi-directional address/data multiplexing logic 423 coupled to a common processor address/data bus 425. As fully explained above, the processor may multiplex address segments and data on the same bus to further reduce the required pin count. The bi-directional address/data multiplexing logic 423 couples the common processor address/data bus 425 alternatively to the address segment data load control logic 413 or to the data port 405 under the direction of a control signal derived from the control signal generator 415. As fully explained above, the mode control signals from the processor may be encoded to indicate whether the processor is using the common processor address/data bus 425 to carry data or an address segment.

The invention described above represents a new departure from the traditional prior art relationships between central processor units and their associated memories. By the addition of some arithmetic intelligence in the memory to assist it in determining the next address that will be accessed, it is possible to gain savings in speed, power and chip pin count compared with the prior art. This is especially interesting for battery operated portable devices employing microprocessors. It will be appreciated that space limitations preclude description of all possible variations and embodiments of the invention that could be derived by a person of ordinary skill in the art based on the foregoing ideas. All such derivations are considered to fall within the scope of the invention as more specifically defined in the following claims.

What is claimed is:

1. A computer memory device, comprising:
   a data store comprising:
   a predetermined number of individually addressable storage cells for storing program instructions and constants; and
   a data port, coupled to said predetermined number of individually addressable storage cells, for exchanging data with an addressed one of said predetermined number of individually addressable storage cells;

an internal addressing means for storing a full address that determines which of said predetermined number of individually addressable storage cells will be accessed during a memory access operation, said full address comprising at least two concatenated address segments, said internal addressing means comprising:

at least two address segment registers, wherein a concatenation of output signals from said at least two address segment registers represents said full address; and address segment input means, coupled to said at least two address segment registers and responsive to a first control signal, for receiving an input address segment from a processor, said received input address segment alternatively representing one of said at least two concatenated address segments, and for storing said input address segment into a corresponding one of said at least two address segment registers as determined by said first control signal;

mode input means for receiving a mode control signal from said processor, said mode control signal alternatively representing one of a plurality of modes;

first control signal generating means, coupled to said mode input means and to said address segment input means, for generating said first control signal in response to said received mode control signal representing an address segment load mode, said generated first control signal indicating which of said at least two address segment registers is to receive said received input address segment from said address segment input means; and second control signal generating means, coupled to said mode input means, for generating a second control signal in response to said received mode control signal, wherein said second control signal indicates that said full address is to be modified without receiving said input address segment from said address segment input means.

2. A computer memory device, comprising:

a data store comprising:

a predetermined number of individually addressable storage cells for storing program instructions and constants; and a data port, coupled to said predetermined number of individually addressable storage cells, for exchanging data with an addressed one of said predetermined number of individually addressable storage cells;

an internal addressing means for storing a full address that determines which of said predetermined number of individually addressable storage cells will be accessed during a memory access operation, said full address comprising at least two concatenated address segments, said internal addressing means comprising:

at least two address segment registers, wherein a concatenation of output signals from said at least two address segment registers represents said full address; and address segment input means, coupled to said at least two address segment registers and responsive to a first control signal, for receiving an input address segment from a processor, said received input address segment alternatively representing one of said at least two concatenated address segments, and for storing said input address segment into a corresponding one of said at least two address segment registers as determined by said first control signal;

mode input means for receiving a mode control signal from said processor, said mode control signal alternatively representing one of a plurality of modes; and first control signal generating means, coupled to said mode input means and to said address segment input means, for generating said first control signal in response to said received mode control signal representing an address segment load mode, said generated first control signal indicating which of said at least two address segment registers is to receive said received input address segment from said address segment input means, wherein said internal addressing means further comprises incrementing means, coupled to said at least two address segment registers and responsive to a second control signal, for adjusting values stored in said at least two address segment registers so as to increment said concatenation of output signals that represents said full address, and wherein said computer memory device further comprises second control signal generating means, coupled to said mode input means and to said incrementing means, for generating said second control signal in response to said received mode control signal indicating a full address increment mode.

3. The computer memory device of claim 1, further comprising interface means, coupled to said data port and to said address segment input means, for exchanging, with said processor, signals alternatively representing said received input address segment and said data.

4. The computer memory device of claim 1, wherein each of said address segments is eight bits wide.

5. The computer memory device of claim 4, wherein each of said data is 8 bits wide.

6. The computer memory device of claim 1, wherein each of said data is 8 bits wide.

7. A computer memory device, comprising:

a data store comprising:

a predetermined number of individually addressable storage cells for storing program instructions and constants; and a data port, coupled to said predetermined number of individually addressable storage cells, for exchanging data with an addressed one of said predetermined number of individually addressable storage cells;

an internal addressing means for storing a full address that determines which of said predetermined number of individually addressable storage cells will be accessed during a memory access operation, said full address comprising at least two concatenated address segments, said internal addressing means comprising:

at least two address segment registers, wherein a concatenation of output signals from said at least two address segment registers represents said full address; and address segment input means, coupled to said at least two address segment registers and responsive to a first control signal, for receiving an input address segment from a processor, said received input address segment alternatively representing one of said at least two concatenated address segments, and for storing said input address segment into a corresponding one of said at least two address segment registers as determined by said first control signal;

mode input means for receiving a mode control signal from said processor, said mode control signal alternatively representing one of a plurality of modes; and first control signal generating means, coupled to said mode input means and to said address segment input means, for generating said first control signal in response to said received mode control signal representing an address segment load mode, said generated first control signal indicating which of said at least two address segment registers is to receive said received input address segment from said address segment input means, wherein said internal addressing means further comprises adjusting means, coupled to said at least two address segment registers and to said data port, and responsive to a first adjusting control signal, for adjusting values stored in said at least two address segment registers so as to cause said concatenation of output signals that represents said full address to be incremented by a data value appearing at said data port after a read operation of said memory, and wherein said computer memory device further comprises adjusting control signal generating means, coupled to said mode input means and to said adjusting means, for generating said first adjusting control signal in response to said received mode control signal indicating a first address adjust mode.

8. The computer memory device of claim 7, wherein said internal addressing means further comprises register means, coupled to said at least two address segment registers and to said data port, and responsive to a second adjusting control signal, for storing a data value appearing at said data port after a read operation of said memory, and wherein said adjusting means is further responsive to a third adjusting control signal for adjusting values stored in said at least two address segment registers so as to cause said concatenation of output signals that represents said full address to be incremented by a value comprising a stored value stored from said register means concatenated with a data value appearing at said data port after a read operation of said memory, and wherein further said adjusting control signal generating means is further coupled to said register means, and said adjusting control signal generating means generates said second adjusting control signal in response to said received mode control signal indicating a second address adjust mode, and generates said third adjusting control signal in response to said received mode control signal indicating a first address adjust mode during a memory operation following a prior memory operation during which a prior received mode control signal indicated said second address adjust mode.

9. A computer memory device, comprising:
a data store comprising:
a predetermined number of individually addressable storage cells for storing program instructions and constants; and
a data port, coupled to said predetermined number of individually addressable storage cells, for exchanging data with an addressed one of said predetermined number of individually addressable storage cells;

an internal addressing means for storing a full address that determines which of said predetermined number of individually addressable storage cells will be accessed during a memory access operation, said full address comprising at least two concatenated address segments, said internal addressing means comprising:

at least two address segment registers, wherein a concatenation of output signals from said at least two address segment registers represents said full address; and address segment input means, coupled to said at least two address segment registers and responsive to a first control signal, for receiving an input address segment from a processor, said received input address segment alternatively representing one of said at least two concatenated address segments, and for storing said input address segment into a corresponding one of said at least two address segment registers as determined by said first control signal;

mode input means for receiving a mode control signal from said processor, said mode control signal alternatively representing one of a plurality of modes; and first control signal generating means, coupled to said mode input means and to said address segment input means, for generating said first control signal in response to said received mode control signal representing an address segment load mode, said generated first control signal indicating which of said at least two address segment registers is to receive said received input address segment from said address segment input means, wherein said internal addressing means further comprises replacing means, coupled to said at least two address segment registers and to said data port, and responsive to a first replacing control signal, for replacing a value stored in one of said at least two address segment registers with a data value appearing at said data port after a read operation of said memory, and wherein said computer memory device further comprises replacing control signal generating means, coupled to said mode input means and to said replacing means, for generating said first replacing control signal in response to said received mode control signal indicating a first address replacing mode.

10. The computer memory device of claim 9, wherein said internal addressing means further comprises register means, coupled to said at least two address segment registers and to said data port, and responsive to a second replacing control signal, for storing a data value appearing at said data port after a read operation of said memory, and wherein said replacing means is further responsive to a third replacing control signal for replacing a first value stored in a first one of said at least two address segment registers with a value stored in said register during a previous memory operation and replacing a second value stored in a second one of said at least two address segment registers with a data value appearing at said data port after a read operation of said memory, and wherein further said replacing control signal generating means is further coupled to said register means, and said replacing control signal generating means generates said second replacing control signal in response to said received mode control signal indicating a second address replace mode, and generates said third replacing control signal in response to said received mode control signal indicating a first address replace mode during a memory operation following a prior memory operation during which a prior received mode control signal indicated said second address replace mode.

11. The computer memory device of claim 2, wherein:

said individually addressable storage cells are organized into a plurality of banks, each bank being selected for access by a predetermined number of low-order bits of said full address taking on a corresponding predetermined value; and said computer memory device further comprises means for automatically initiating a memory fetch operation after said full address is incremented, in order to prefetch data for retrieval by said processor during a subsequent memory access.

* * * * *